United States Patent
Parish

(10) Patent No.: US 8,318,064 B2
(45) Date of Patent: Nov. 27, 2012

(54) METHOD FOR MANUFACTURING COMBUSTIBLE PRODUCTS

(75) Inventor: Bart P. Parish, Corinth, TX (US)

(73) Assignee: Balcones Recycling, Inc., Austin, TX (US)

( * ) Notice: Subject to any disclaimer, the term of this patent is extended or adjusted under 35 U.S.C. 154(b) by 1354 days.

(21) Appl. No.: 10/757,828

(22) Filed: Jan. 15, 2004

(65) Prior Publication Data

US 2004/0200138 A1   Oct. 14, 2004

Related U.S. Application Data

(60) Provisional application No. 60/440,162, filed on Jan. 15, 2003.

(51) Int. Cl.
 *D01D 5/00* (2006.01)
 *B28B 17/02* (2006.01)
 *C10L 5/00* (2006.01)

(52) U.S. Cl. ....................................................... 264/140

(58) Field of Classification Search .................... 264/140
See application file for complete search history.

(56) References Cited

U.S. PATENT DOCUMENTS

| | | | |
|---|---|---|---|
| 3,547,577 A * | 12/1970 | Lovercheck | 53/511 |
| 4,236,897 A | 12/1980 | Johnston | |
| 4,529,407 A | 7/1985 | Johnston et al. | |
| 4,789,507 A * | 12/1988 | Wesley et al. | 264/29.2 |
| 4,952,216 A | 8/1990 | Good | |
| 5,342,418 A | 8/1994 | Jesse | |
| 5,643,342 A | 7/1997 | Andrews | |
| 5,980,595 A | 11/1999 | Andrews | |
| 6,017,475 A * | 1/2000 | Cantrell | 264/140 |
| 6,635,093 B1 | 10/2003 | Schoen et al. | |

* cited by examiner

*Primary Examiner* — Christina Johnson
*Assistant Examiner* — Patrick Butler
(74) *Attorney, Agent, or Firm* — DuBois, Bryant & Campbell, LLP; William D. Wiese

(57) ABSTRACT

This present invention is for an improved method of recycling waste materials consisting substantially of cellulosic fiber and thermoplastic resin to make combustible products useful as industrial fuel with high heat output. The preferred method utilizes a low-speed and high-torque grinder to facilitate the continuous processing of feedstock. One advantage of the present invention over the prior art is the ability to continuously process feedstock while reducing the risk of fire.

38 Claims, 1 Drawing Sheet

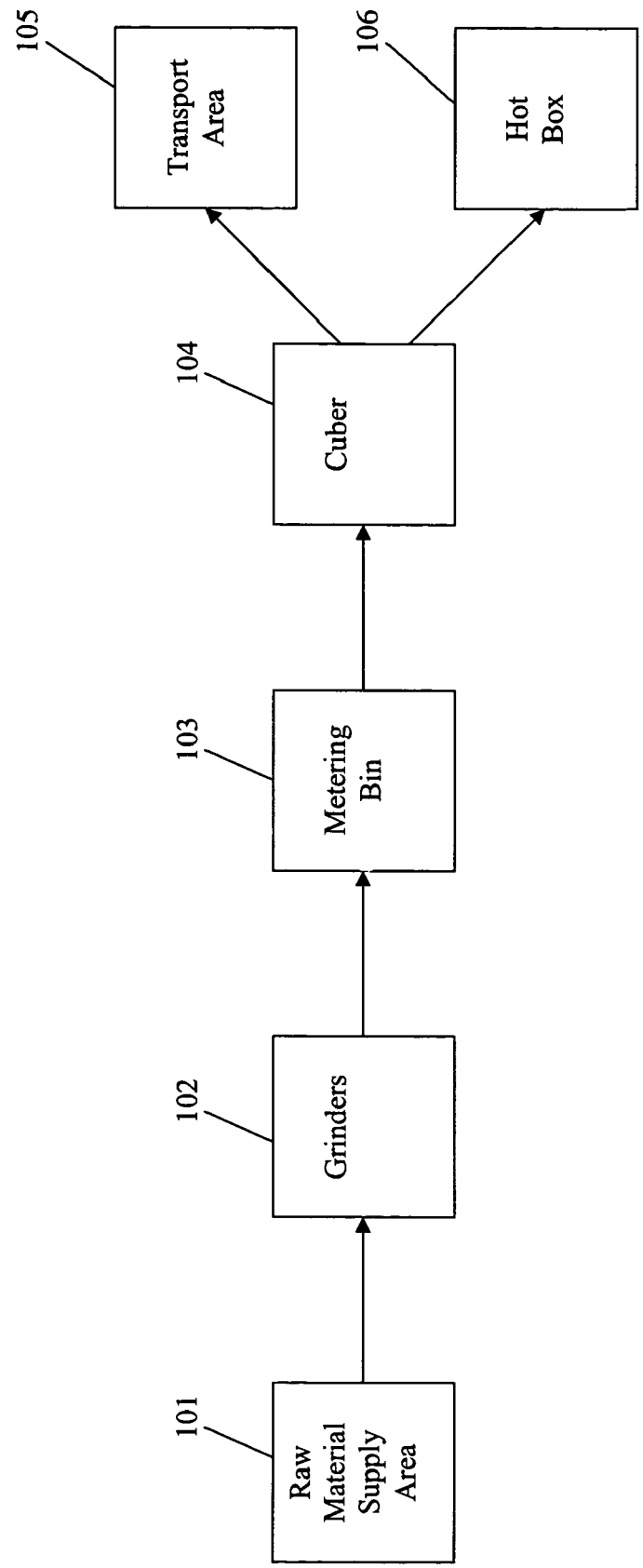

METHOD FOR MANUFACTURING COMBUSTIBLE PRODUCTS

REFERENCE TO RELATED APPLICATION

This present application claims benefit from U.S. Provisional Patent Application Ser. No. 60/440,162 filed Jan. 15, 2003 in the name of Bart Preston Parish entitled "Method and System for Making Combustible Products from Recyclable Materials."

BACKGROUND OF THE INVENTION

1. Field

The system and method of the present invention pertains to the field of recycling waste materials comprising cellulosic fiber and thermoplastic resin; more particularly, an improved method for processing recycled such combustible materials into products capable of generating high heat outputs.

2. Background

An increasing number of consumer products are made from thermoplastic resin such as, for example, adhesive liners and medical gowns. Some products, such as, for example, disposable diapers, are primarily made up of thermoplastic resin and cellulosic fiber wherein the thermoplastic material provides a moisture-proof lining on the outside of the diaper and the cellulosic fiber provides the bulky absorbent media on the inside. The cellulosic fiber holds and retains all moisture, while the thermoplastic material ensures that there is no external leakage.

When products such diapers, adhesive liners, hygiene pads and the like are manufactured, a certain amount of waste is inevitable, resulting in so-called "pre-consumer waste." In addition, many of these products are disposable in nature and, as a result, are used just once and thrown away resulting in "post-consumer waste." The ultimate disposal of pre-consumer and post-consumer waste typically involves transporting it to the local landfill. Environmentalists abhor this type of disposal as being wasteful both in the manufacture and disposal of these products. For example, the manufacture of disposable diapers requires forest products to obtain the necessary cellulose and the disposal of the diapers utilizes valuable landfill space. Moreover, the U.S. Environmental Protection Agency (EPA) has placed increase restrictions on landfill requirements. For example, the EPA has recently enforced the requirement of double lining landfills for disposal of paper mill sludge. Consequently, there has been a dramatic increase in cost for establishing new landfills that comply with EPA requirements for paper mill by-products.

In addition to the increased reluctance to use forest products and increased restrictions in landfill requirements, there has also be an increase in demand for new sources of energy. Combustible products made from cellulosic fibers and thermoplastic resins offer a higher BTU output and provide a clean-burning alternative to conventional fuels. However, use of available cellulosic waste as a fuel source has achieved only limited acceptance to date. One reason for this is the relatively low heating value of cellulose as compared to, for example, coal. For example, cellulosic fibers alone can have a heating value of less than 7,000 BTU's per pound, while coal generally has heating value in excess of 9,000 BTU's per pound.

Methods and systems for processing materials consisting substantially of thermoplastic resin and cellulosic fiber into combustible materials are well known in the art. However, there are a number of difficulties in processing these materials. For example, in recent years, many companies have made significant advances in improving the tear-resistant properties of thermoplastic materials such as, for example, through highly cross-linking or otherwise processing the thermoplastic polymers. These highly tear-resistant materials, by their very nature, are exceptionally difficult to process using conventional means. For example, if these materials are processed through normal shredder devices, the shredder will quickly become bound-up and, in many cases, cease operating. Moreover, because the materials are combustible by nature, they have a propensity for catching fire if exposed to high heat or friction, such as during processing. As a result, if the operator is successful in maintaining the operation of the shredder, the friction involved in processing these materials creates an extreme fire hazard. There is a need, therefore, for an improved method for processing recycled combustible materials into products capable of generating high heat outputs.

As previously mentioned, a number of combustible products, and processes for manufacturing combustible products, have been patented in the United States. For example, U.S. Pat. No. 4,236,897 to Johnston discloses a fuel pellet comprised of natural cellulosic material and synthetic polymeric thermoplastic material. The patent disclosed the composition of the cellulose (substantially 5 mesh with a moisture content of about 5 to about 15 percent by weight, and comprising from about 90 to 99 percent by weight of the fuel pellet) and the thermoplastic material (between 5 and 10 mesh and comprising about 1 to 10 percent by weight of the fuel pellet). An average fuel analysis of the fuel pellets tested produced up to 9,180 BTU per pound. However, Johnson does not disclose the method for processing feedstock that maintains a continuous flow of feedstock while reducing the risk of fire.

Similarly, U.S. Pat. No. 5,342,418 to Jesse discloses a method of making a fuel pellet comprised of cellulosic material. The fuel pellet described therein is comprised of 60 to 90 percent by weight of cellulosic material, and 10 to 40 percent by weight of a thermoplastic resin. The heat output of the fuel pellets is between 9,500 and 11,500 BTU per pound. Again, the process described by Jesse does not provide for the continuous processing of feedstock while reducing the risk of fire.

Accordingly, it is an object of this invention to provide an improved method for processing recycled combustible materials consisting substantially of thermoplastic resins and cellulosic materials into products capable of generating high heat outputs such as, for example, in excess of 10,000 BTU per pound.

Another object is to provide an improved method for producing combustible products from conventional disposable diaper stock, disposable hygiene pad stock or a combination thereof.

A further object is to provide an improved method for producing combustible products from a cellulosic fiber component and a thermoplastic resin component.

SUMMARY

This present invention is for an improved method of recycling waste materials consisting substantially of cellulosic fiber and thermoplastic resin to make combustible products useful as industrial fuel with high heat output. The preferred method utilizes low-speed and high-torque equipment to facilitate the continuous processing of feedstock. One advantage of the present invention over the prior art is the ability to continuously process feedstock while reducing the risk of fire.

BRIEF DESCRIPTION OF THE DRAWING FIGURES

A better understanding of the system and method of the present invention may be had by reference to the drawing FIGURE, wherein:

FIG. 1 shows a flow diagram of the process of the present invention.

DESCRIPTION OF THE EMBODIMENTS

FIG. 1 shows a flow diagram of the process of the present invention. At the raw material supply area 101, feedstock is brought into the facility. The feedstock can consist, for example, of non-saleable waste materials from paper mills, such as disposable diapers, hygiene pads, hospital gowns and the like. The feedstock may be made up of thermoplastic material and cellulosic material. The thermoplastic material can be practically any available thermoplastic such as, but not limited to, polystyrene, polyethylene, polypropylene, acrylonitrile-butadienestyrene, acetal copolymer, acetal homopolymer, acrylic, polybutylene, and combinations thereof. However, thermoplastic materials most useful in the present invention are illustrated generally by the polyolefins such as polyethylene, polypropylene, polybutylene, and the like. Other thermoplastic resins are suitable so long as they have softening properties similar to the polyolefins, whereby they serve as lubricants for processing the feedstock, and as bonding agents to assist in bonding the layers together to make the finished combustible products.

For fast burning and ease of ignition of the fuel pellets, polypropylene and polyethylene are the preferred synthetic thermoplastic materials. In one embodiment of the invention, feedstock is approximately 60% non-chlorinated thermoplastic materials and 40% cellulosic fibers.

One suitable composition, which can be used by itself as feedstock is conventional disposable diapers, including the plastic outer layer, the absorbent fibrous batting and the liquid transport layers adjacent the inner surface of the diaper. Conventional superabsorbents used in typical disposable diapers are acceptable as feedstock. Another suitable feedstock is conventional disposable hygiene pads, including plastic outer layer and release paper, absorbent fibrous batting and, optionally, an inner surface layer comprising synthetic fibers, the inner surface layer being adapted for placement against the body. In the case of disposable diapers, the cellulosic fiber required in this invention comprises the cellulosic fiber contained in the diaper stock, and the thermoplastic resin required in this invention comprises the thermoplastic outer layer in the diaper stock. In the case of hygiene pads, the cellulosic fiber element required in this invention comprises the cellulosic fiber contained in the hygiene pad stock, and the thermoplastic resin required in this invention comprises the thermoplastic outer liner in the hygiene pad stock.

Thermoplastic resins whose combustion produces harmful stack gas emissions are not acceptable for use in any more than nominal amounts in this invention and, in general, although thermoplastics containing a halogen such as polyvinylchloride can be used, for most applications there are to be avoided, because of corrosion and emission problems associated with the combustion products of halogen-containing thermoplastics. Similarly, compositions which produce objectionable quantities of heavy metal waste either in the ash or in the stack gas are not acceptable for use in this invention.

Feedstock can be stored in the raw material supply area 101 awaiting other similar materials can be co-processed or, in some cases, different types of raw material supply may be blended together, to create a feedstock of desired thermal consistency. In this area, the feedstock can be treated to separate foreign matter. This can be done by such equipment as pneumatic conveyors, screens, magnets or combinations thereof. The feedstock can also be dried, if necessary for optimal processing, in the raw material supply area 101.

One skilled in the art will recognize that other materials may be processed with the feedstock such as, for example, to improve the combustibility of the finished product. Oxidizing agents such as sodium perchlorate and ammonium nitrate to facilitate combustion can be included in the feedstock. Materials such as comminuted tires, thermosetting resins and/or petroleum distillation residue can be added to improve the heating value of the finished product. Also, binding agents in addition to thermoplastic materials can be used. Exemplary of such binding agents are paraffin slack wax, carnuba wax, and lignosulfonates, such as ammonium lignosulfonate, sodium lignosulfonate, calcium lignosulfonate, and magnesium lignosulfonate.

In addition, certain cellulosic materials can be added as a processing aid. Preferred materials in this category are oil seeds and their products, which by their fatty acid content reduce wear on the dies of the cuber 104. Exemplary of such materials which can be included are coconut husks, soy beans, peanuts, sunflower seeds, corn cake, pressing residuals, and the like.

Feedstock from the raw material supply area 101 is next fed into the grinders 102. As used herein, the term "grinder" refers to any device used for the purpose of reducing the size of the feedstock, including by grinding, shredding, pulverizing, chopping, granulating, crushing or the like. The purpose of the grinder 102 is to reduce the feedstock to a size suitable for passing through the cuber 104. However, the process of reducing the size of the feedstock causes friction which creates heat. While this heat may be useful in softening the thermoplastic material and thereby facilitating the reduction process, it also can cause the combustible materials to ignite during processing. These potential fires create significant risk to the workers on the process line, the processing equipment, the product being processed and the processing schedule.

In order to minimize the risk of fire, it is preferable to operate the grinder 102 at high torque, low speed settings. For example, grinder speeds in the range of 75 to 80 rpms with torque settings of between about 18,000 and 20,000 ft-lbs per shaft motor, preferably about 19,520 ft-lbs per shaft motor, have been found to work well for continuously grinding feedstock while minimizing the risk of fire. Conveyors move the ground feedstock from the grinder 102 to the metering bins 103 in which the material is accumulated for cubing. The metering bins also meter the ground feedstock onto the cuber 104 inlet to maximize the efficiency of the cuber 104.

The ground feedstock is next passed through a cuber 104 consisting of an auger or augers, a press wheel and series of dies for the purpose of extruding the material into the desired shape. As the name implies, the cuber 104 can form the ground feedstock into cubes, however there are a number of other shapes that the cuber 104 may form that may be as, or more, desirable as combustible products. As used herein, the term "cube" refers to a discrete product of any size or shape that contains both cellulosic material and thermoplastic material. The cube need not be square or even symmetrical. While it may be useful to form the products in the shape of cubes, they can be any suitable symmetrical configuration such as the shape of a tube or a sphere. In one embodiment of the invention, elongated "cubes" are formed that are approximately 1 inch by 2 inches. The cuber 104 is operated at a pressure of between about 7,000 and 10,000 psi and a temperature of about between 300 and 400 degrees Fahrenheit, with the temperature depending on the specific blend of the material and the moisture content in the feedstock. This combination of high pressure and temperature serves to seal the edges of the cubes. The processing of the ground feedstock at high heat creates a substantially water-impervious coating, or sheath on the outside of the combustible products, thereby both preventing uptake of moisture by the combustible products and resisting weathering in storage. Furthermore, the hydrophobic nature of the plastic prevents water uptake such that combustible products can be left out in the rain and still be readily processed in a furnace with no deterioration in heat output.

After the material has been processed through the cuber 104 into the desired shape of combustible product, it is carried along conveyor lines to a transport area 105 for storage for subsequent shipment or for loading directly on trucks to be transported to end users. If heat sensors along the conveyor lines detect that the shaped combustible products have a temperature greater than a pre-specified limit, the products are diverted from the transport area 105 to a hot box area 106 specially designed to control fires. The hot box area 106 is generally located outside of the processing facility and is equipped, for example, with automatic sprinkler heads, fire fighting hoses, carbon dioxide deluge systems and similar fire fighting equipment. In addition to the fire fighting equipment in the hot box area 106, a number of the other area, such as the grinders 102 and the metering bins 103 are equipped with fire fighting equipment. Also, the entire facility is generally equipped with a dust removal system to improve the quality of the air inside the building and reduce the risk of fire.

As can be appreciated by one skilled in the art, the foregoing process is highly dependent on a number of variables such as processing speeds of the grinder 102 and the cuber 104, power consumption of the grinder 102 and the cuber 104, moisture content of the feedstock, ambient temperature and humidity and the like. Management of the variables, and the optimization of the overall process by adjusting the variables, can be exceptionally complex. As part of the invention disclosed herein, the foregoing process is controlled and monitored by computer software wherein variables relating to the characteristics of the process for producing combustible products are monitored by such software and, through feed back to the processing equipment controlled by the software, adjustments are made to the process. characteristics of the process for producing combustible products could include any number of measurable parameters including, for example, amperage draw of the grinder, the amperage draw of the cuber, the speed of the grinder the heat generated in the grinder, the heat generated in the cuber, the speed of the grinder; the speed of the cuber, the pressure required to perform the cubing operation. While the software can be used to optimize the process as previously discussed, the software can also be used to monitor the ongoing process so that deviations from a pre-designated set of parameters are automatically adjusted by the software or are programmed to send a signal alerting the operator of the deviation.

By way of example, combustible products produced using the present invention have been successfully burned in a number of different kinds of furnaces, including rotary kiln furnaces, gacifiers and traveling-grate stoker-spreader boilers. The average heat of combustion was determined to be between 12,400 and 13,500 BTU per pound. The ingredients in the combustible products generating 13,500 BTU per pound are shown in Table 1.

TABLE 1

| Average Heat of Combustion 13,500 Btu/Lb. | |
|---|---|
| Ash | <1.0% |
| Hydrogen | 10% |
| Carbon | 61% |
| Sulfur | <0.5% |
| Oxygen | 28% |
| Nitrogen | 228 PPM |
| Sodium | <0.5% |
| Total Halogens (as Chlorine) | <0.5% |

These materials were also tested for heavy metal content and the results are shown in Table 2.

TABLE 2

| Mercury | <0.034 mg/kg |
|---|---|
| Arsenic | <1.1 mg/kg |
| Lead | 2.2 mg/kg |
| Selenium | <0.54 mg/kg |
| Barium | 2.5 mg/kg |
| Cadmium | <0.32 mg |
| Chromium | <1.1 mg/kg |
| Silver | <1.1 mg/kg |

TCLP Metals, Volatile and Semi-Volatile Compounds: (Using Methods: SW846-6010/1311, 8260 and 8270C respectively) All TCLP elements and compounds were non-detectable.

While the present system and method has been disclosed according to the preferred embodiment of the invention, those of ordinary skill in the art will understand that other embodiments have also been enabled. Such other embodiments shall fall within the scope and meaning of the appended claims.

I claim:

1. A method for making combustible products from recyclable materials comprising:
   blending feedstock, wherein said feedstock consists essentially of thermoplastic material, cellulosic fibers or combinations thereof;
   inputting said blended feedstock into a grinder for the purpose of reducing the size of said blended feedstock, wherein said grinder operates at a torque of between about 18,000 and about 20,000 ft-lbs of torque per motor shaft;
   compressing and extruding said reduced blended feedstock through a cuber so as to create combustible products; and
   monitoring the temperature of said combustible products for purposes of fire prevention.

2. A method for preparing combustible products from thermoplastic material and cellulosic fibers comprising:
   selecting feedstock consisting essentially of thermoplastic material, cellulosic fibers or combinations thereof;
   feeding said feedstock through a size reduction apparatus, wherein said size reduction apparatus operates at a torque of between about 18,000 and about 20,000 ft-lbs of torque per motor shaft;
   feeding said reduced feedstock through a cuber, including forcing said feedstock through die holes to form combustible products; and
   monitoring the temperature of said combustible product for purposes of fire prevention.

3. The method of claim 2 wherein said size reduction apparatus operates at a speed of between about 75 and about 80 rpms.

4. The method of claim 2 wherein said thermoplastic material is selected from the group consisting of polyethylene, polypropylene, polystyrene, acrylonitrile-hutadiene styrene, acetal copolymer, acetal homopolymer, acrylic, polybutylene and combinations thereof.

5. The method of claim 2 wherein said feedstock is selected from the group consisting of byproducts from the production of disposable diapers, byproducts from the production of sanitary pads, byproducts from the production of adhesive liners, byproducts from the production of hospital gowns and combinations thereof.

6. The method of claim 2 wherein said feedstock is selected from the group consisting of waste from the production of disposable diapers, waste from the production of sanitary pads, waste from the production of adhesive liners, waste from the production of hospital gowns and combinations thereof.

7. A method for manufacturing a combustible product comprising:
supplying feedstock into a grinder, wherein said feedstock consists essentially of thermoplastic material, cellulosic fibers or combinations thereof;
grinding said feedstock at a torque of between about 18,000 and about 20,000 ft-lbs of torque per motor shaft;
feeding said ground feedstock through a cuber to form combustible products; and
monitoring the temperature of said combustible products for purposes of fire prevention.

8. The method of claim 7 wherein said grinder operates at a speed of between about 75 and about 80 rpms.

9. The method of claim 7 wherein said thermoplastic material is selected from the group consisting of polyethylene, polypropylene, polystyrene, acrylonitrile-butadiene styrene, acetal copolymer, acetal homopolymer, acrylic, polybutylene and combinations thereof.

10. The method of claim 7 wherein said feedstock is selected from the group consisting of byproducts from the production of disposable diapers, byproducts from the production of sanitary pads, byproducts from the production of adhesive liners, byproducts from the production of hospital gowns and combinations thereof.

11. The method of claim 7 wherein said feedstock is selected from the group consisting of waste from the production of disposable diapers, waste from the production of sanitary pads, waste from the production of adhesive liners, waste from the production of hospital gowns and combinations thereof.

12. A method for manufacturing a combustible product comprising:
supplying feedstock into a grinder, wherein said feedstock consists essentially of thermoplastic material, cellulosic fibers or combinations thereof;
grinding said feedstock at a torque of between about 18,000 and about 20,000 ft-lbs of torque per motor shaft;
feeding said ground feedstock through a cuber to form combustible products; and
monitoring the temperature of said combustible products for purposes of fire prevention.

13. The method of claim 12 wherein said grinder operates at a speed of between about 75 and about 80 rpms.

14. The method of claim 12 wherein said thermoplastic material is selected from the group consisting of polyethylene, polypropylene, polystyrene, acrylonitrile-butadiene styrene, acetal copolymer, acetal homopolymer, acrylic, polybutylene and combinations thereof.

15. The method of claim 12 wherein said feedstock is selected from the group consisting of byproducts from the production of disposable diapers, byproducts from the production of sanitary pads, byproducts from the production of adhesive liners, byproducts from the production of hospital gowns and combinations thereof.

16. The method of claim 12 wherein said feedstock is selected from the group consisting of waste from the production of disposable diapers, waste from the production of sanitary pads, waste from the production of adhesive liners, waste from the production of hospital gowns and combinations thereof.

17. A method for manufacturing a combustible product comprising:
supplying feedstock into a grinder, wherein said feedstock consists essentially of thermoplastic material, cellulosic fibers or combinations thereof;
grinding said feedstock at a torque of between about 18,000 and about 20,000 ft-lbs of torque per motor shaft;
feeding said ground feedstock through a cuber to form combustible products;
monitoring the operational characteristics of said grinder and said cuber using a software application, wherein said operational characteristics can be monitored and controlled using said application; and
monitoring the temperature of said combustible product for purposes of fire prevention.

18. The method of claim 17 wherein said operational characteristics are selected from the group consisting of amperage draw of said grinder, the amperage draw of said cuber, the speed of said grinder, the heat generated in said grinder, the heat generated in said cuber, the speed of said grinder, the speed of said cuber, and the pressure required to perform the cubing operation.

19. The method of claim 17 wherein said feedstock is ground at between about 75 and about 80 rpms.

20. A method for making combustible products from recyclable materials comprising:
blending feedstock, wherein said feedstock consists essentially of thermoplastic material, cellulosic fibers or combinations thereof;
inputting said blended feedstock into a grinder for the purpose of reducing the size of said blended feedstock, wherein said grinder operates at a torque of between about 18,000 and about 20,000 ft-lbs of torque per motor shaft;
compressing and extruding said reduced blended feedstock through a cuber so as to create combustible products; and
monitoring the temperature of said combustible products for purposes of fire prevention.

21. A method for preparing combustible products from thermoplastic material and cellulosic fibers comprising:
selecting feedstock consisting essentially of thermoplastic material, cellulosic fibers or combinations thereof;
feeding said feedstock through a size reduction apparatus, wherein said size reduction apparatus operates at a torque of between about 18,000 and about 20,000 ft-lbs of torque per motor shaft;
feeding said reduced feedstock through a cuber, including forcing said feedstock through die holes to form combustible products; and
monitoring the temperature of said combustible products for purposes of fire prevention.

22. The method of claim 21 wherein said size reduction apparatus operates at a speed of between about 75 and about 80 rpms.

23. The method of claim 21 wherein said thermoplastic material is selected from the group consisting of polyethylene, polypropylene, polystyrene, acrylonitrile-hutadiene styrene, acetal copolymer, acetal homopolymer, acrylic, polybutylene and combinations thereof.

24. The method of claim 21 wherein said feedstock is selected from the group consisting of byproducts from the production of disposable diapers, byproducts from the production of sanitary pads, byproducts from the production of adhesive liners, byproducts from the production of hospital gowns and combinations thereof.

25. The method of claim 21 wherein said feedstock is selected from the group consisting of waste from the production of disposable diapers, waste from the production of sanitary pads, waste from the production of adhesive liners, waste from the production of hospital gowns and combinations thereof.

26. A method for manufacturing a combustible product comprising:
   supplying feedstock into a grinder, wherein said feedstock consists essentially of thermoplastic material, cellulosic fibers or combinations thereof;
   grinding said feedstock at a torque of between about 18,000 and about 20,000 ft-lbs of torque per motor shaft;
   feeding said ground feedstock through a cuber to form combustible products; and
   monitoring the temperature of said combustible products for purposes of fire prevention.

27. The method of claim 26 wherein said grinder operates at a speed of between about 75 and about 80 rpms.

28. The method of claim 26 wherein said thermoplastic material is selected from the group consisting of polyethylene, polypropylene, polystyrene, acrylonitrile-butadiene styrene, acetal copolymer, acetal homopolymer, acrylic, polybutylene and combinations thereof.

29. The method of claim 26 wherein said feedstock is selected from the group consisting of byproducts from the production of disposable diapers, byproducts from the production of sanitary pads, byproducts from the production of adhesive liners, byproducts from the production of hospital gowns and combinations thereof.

30. The method of claim 26 wherein said feedstock is selected from the group consisting of waste from the production of disposable diapers, waste from the production of sanitary pads, waste from the production of adhesive liners, waste from the production of hospital gowns and combinations thereof.

31. A method for manufacturing a combustible product comprising:
   supplying feedstock into a grinder, wherein said feedstock consists essentially of thermoplastic material, cellulosic fibers or combinations thereof;
   grinding said feedstock at a torque of between about 18,000 and about 20,000 ft-lbs of torque per motor shaft;
   feeding said ground feedstock through a cuber to form combustible products; and
   monitoring the temperature of said combustible products for purposes of fire prevention.

32. The method of claim 31 wherein said grinder operates at a speed of between about 75 and about 80 rpms.

33. The method of claim 31 wherein said thermoplastic material is selected from the group consisting of polyethylene, polypropylene, polystyrene, acrylonitrile-butadiene styrene, acetal copolymer, acetal homopolymer, acrylic, polybutylene and combinations thereof.

34. The method of claim 31 wherein said feedstock is selected from the group consisting of byproducts from the production of disposable diapers, byproducts from the production of sanitary pads, byproducts from the production of adhesive liners, byproducts from the production of hospital gowns and combinations thereof.

35. The method of claim 31 wherein said feedstock is selected from the group consisting of waste from the production of disposable diapers, waste from the production of sanitary pads, waste from the production of adhesive liners, waste from the production of hospital gowns and combinations thereof.

36. A method for manufacturing a combustible product comprising:
   supplying feedstock into a grinder, wherein said feedstock consists essentially of thermoplastic material, cellulosic fibers or combinations thereof;
   grinding said feedstock at a torque of between about 18,000 and about 20,000 ft-lbs of torque per motor shaft;
   feeding said ground feedstock through a cuber to form combustible products;
   monitoring the temperature of said combustible products for purposes of fire prevention; and
   monitoring the operational characteristics of said grinder and said cuber using a software application, wherein said operational characteristics can be monitored and controlled using said application.

37. The method of claim 36 wherein said operational characteristics are selected from the group consisting of amperage draw of said grinder, the amperage draw of said cuber, the speed of said grinder, the heat generated in said grinder, the heat generated in said cuber, the speed of said grinder, the speed of said cuber, and the pressure required to perform the cubing operation.

38. The method of claim 36 wherein said feedstock is ground at between about 75 and about 80 rpms.

* * * * *